Patented Nov. 5, 1929

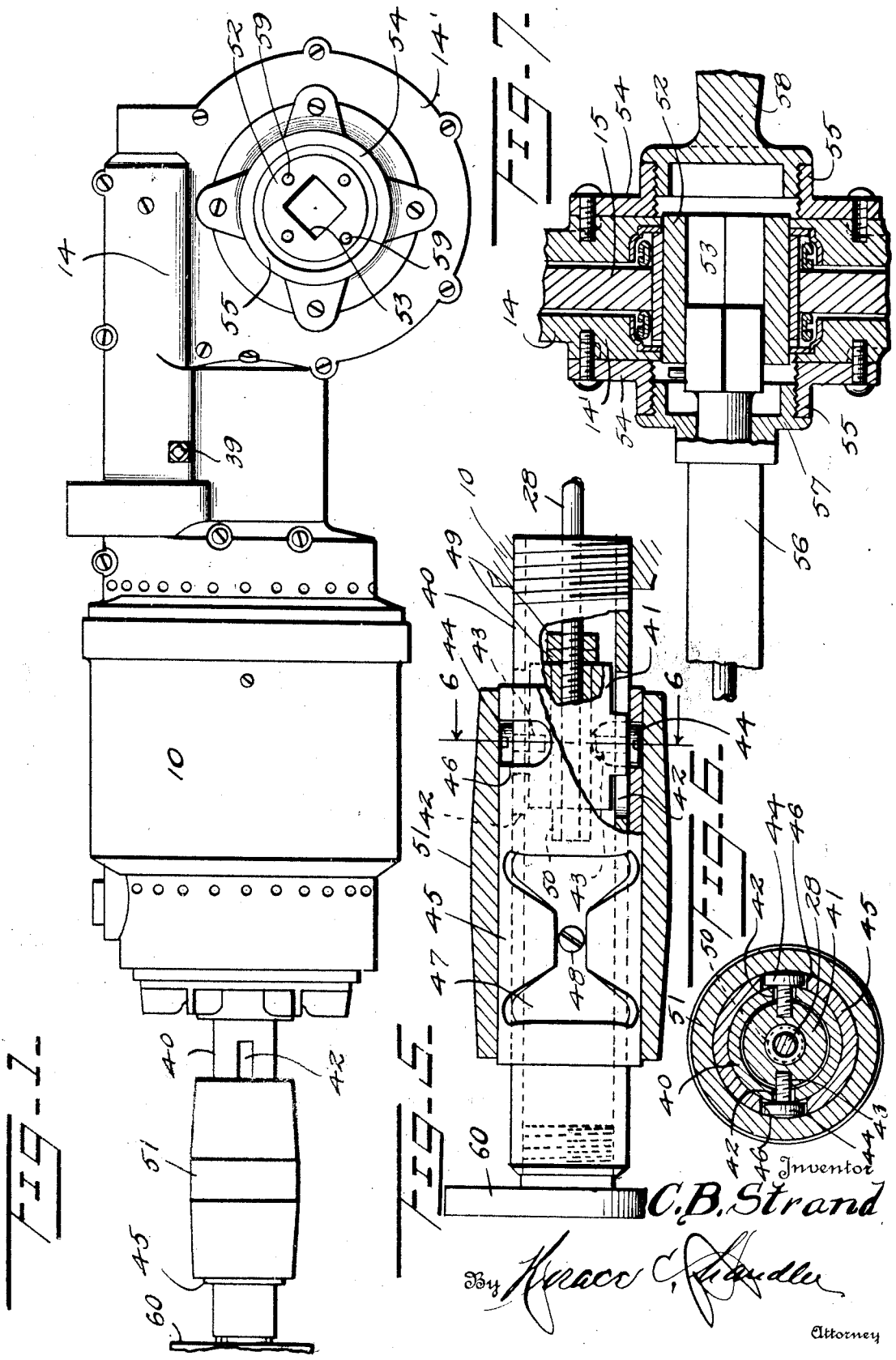

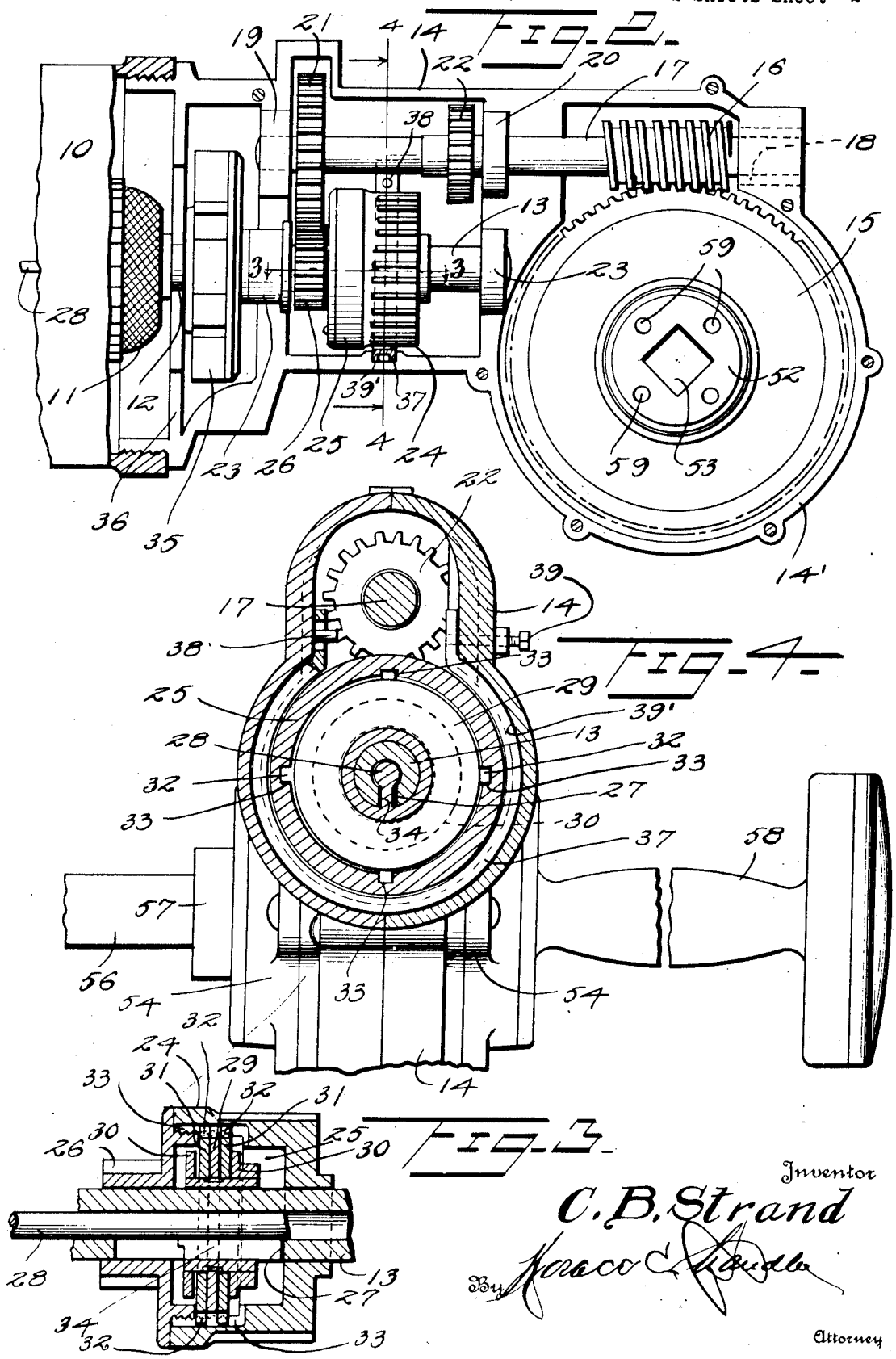

1,734,406

UNITED STATES PATENT OFFICE

CLARENCE B. STRAND, OF MAHNOMEN, MINNESOTA

MOTOR-OPERATED ASSEMBLING TOOL

Application filed February 20, 1928. Serial No. 255,735.

This invention has particular reference to motor driven tools, and particularly to the motors and gears thereof.

One object of the invention is to provide a novel and improved means for shifting from one gear speed position to another, while the motor is in operation.

Another object is to provide a novel and improved clutch for maintaining the shiftable gear in either of its shifted positions.

Another object is to provide means whereby said shiftable gear is slowed down, while being moved from one position to another, whereby to more properly insure the meshing thereof with the high and low speed gears of the gear set.

Another object is to provide novel means for cooling the motor, and arranging such cooling means whereby it will not come into contact with the stator or rotor of the motor.

Other objects and advantages will be apparent from the following description when taken in connection with the accompanying drawings.

In the drawings:

Figure 1 is a side elevation of a motor driven device made in accordance with the present invention.

Figure 2 is a side elevation of the gear housing, the side of the housing being removed to expose the gears therein.

Figure 3 is a longitudinal sectional view on the line 3—3 of Figure 2.

Figure 4 is a transverse sectional view on the line 4—4 of Figure 2.

Figure 5 is a plan view of the gear shifting handle, said handle being in the position assumed when the gears are in neutral position, the hand grip being in section.

Figure 6 is a transverse sectional view through the gear shifting handle, and the associated parts, on the line 6—6 of Figure 5.

Figure 7 is a detail view of one of the tools, showing the means for attaching the same to the spider, and the portion which is engaged in the hub of the large worm gear, such parts being shown in section.

Referring particularly to the accompanying drawings, 10 represents a housing in which is mounted the electric motor 11, said motor including a shaft 12 having a hollow shaft section 13 secured to one end thereof. Removably secured to one end of the motor housing 10 is a gear housing 14, which is preferably formed in two sections, to permit removal of one of said sections, and ready access to the gears therewithin. The gear housing includes a flat circular portion 14', within which is mounted the large worm gear 15, said gear meshing with a worm 16 on a shaft 17 which extends longitudinally through the housing at one side of said circular portion. One end of the shaft 17 is rotatably supported in a bushing 18, while the other end and intermediate portions are supported in suitable bearings 19 and 20, within the housing. On the shaft 17, adjacent the bearing 19 is a comparatively large gear 21, while a smaller gear 22 is mounted on the shaft adjacent the bearing 20. Adjacent the gear carrying portion of the shaft 17, and arranged in parallel relation thereto, is a shorter shaft 13, carried by the shaft of the motor, as above mentioned. The shaft 13 is mounted in suitable bearings 23, within the housing, and slidable on said shaft section is a shiftable gear 24, which, when in one shifted position meshes with the gear 22. Removably secured to the other end of the gear 24, and covering the chamber 25, of said gear, is a smaller gear 26, which, when the gear 24 is shifted to its other position, meshes with the gear 21, of the shaft 17. The shaft section 13 is formed with a longitudinal slot 27, over which the gear 24 moves when being shifted. Disposed longitudinally through the motor shaft, and through the hollow shaft section 13, is a rod 28, and disposed on one end of said rod are three equally spaced metal disks 29 and 30, the former being slidable intermediate the other two. Between the disks 30 and the disk 29, and arranged on each side of the latter, are the loosely arranged disks 31, each having a plurality of radially extending lugs 32 on its periphery for slidable engagement in the grooves 33 formed in the inner wall of the chamber of the gear 24. That portion of the rod 28 which is secured within the central openings of the disks 30 is formed with a radially extending web 34, which is secured to said disks 30, and to the disk 29, and is slidably arranged in the slot 27 of the shaft section 13, whereby the rod 28, the disks 29 and 30, and the shaft 13 turn in unison. On the motor shaft, within the gear housing is fixed a fan wheel 35, which rotates with the shaft for the purpose of cooling the motor, said fan being separated from the armature of the motor by a wall 36, whereby to prevent contact of said elements, which might injure the armature. Encircling the shiftable gear 24 is a band brake 37, one end of which is slotted and engaged on a pin carried within the housing, while the other end is engaged by a screw 39, engaged through the side of the housing, the said pin being shown at 38. This brake band serves to slow up the gear 24, as the latter is shifted from one speed position to the other, with the result that meshing of said gear, with the gears 21 and 22, is more readily effected, especially while the motor is in motion. The band remains stationary, while the gear 24 is shifted from one speed position to the other. A groove 39' is formed in the interior of the gear housing to receive and retain the brake band in position while said gear 24 is moved therethrough.

Secured in the other end of the motor housing is a hollow shaft 40, and disposed within said shaft is a sleeve 41, through which the threaded end of the rod 28 is disposed. Formed longitudinally in opposite sides of the shaft 40 are the slots 42, and disposed through said slots, and screwed into the opposite sides of said sleeve, are the screws 43, each having on its outer end a roller 44. Slidable on the shaft 40 is a second sleeve 45, having circumferential slots 46 in which the rollered ends of the screws 43 are disposed, while an H-shaped opening 47 is formed in the sleeve 45, and receives therein the head of a screw 48 engaged in the shaft 40. It will be noted that the inner walls of the circumferential portions of the H-shaped slot 47 are inclined, whereby to produce a wedging action upon said screw head 48. Upon partially rotating the sleeve 45 the sleeve can then be slipped longitudinally of the shaft 40, the screw 48 readily passing through the central longitudinal portion of the slot 47. Then, upon turning the sleeve 45 toward either the right or left, the inclined walls of the slot 47 will act upon the screw, whereby to effectively bind, and lock the sleeve against accidental rotation out of its adjusted position. Engaged on the threaded end of the rod 28, and bearing against the inner end of the sleeve 41, are the nuts 49, while a nut 50 is engaged on the rod and bears against the outer end of the sleeve, thereby locking the rod to the sleeve. The sleeve 45 is covered with a sleeve of insulation, or like material, to form the hand-grip 51, which is grasped by the operator to slide the sleeve 45 on the shaft 40, when shifting the gears.

The center of the large worm gear 15 is formed with a hub 52, through the center of which is formed an angular opening 53, for the reception of the angular ends of various tools to be driven by the motor. Secured to each side of the gear housing is a spider 54, having an internally threaded flange 55, surrounding the said hub 52. Each of the tools is provided with a sleeve 56, on which is engaged a threaded collar 57, said collar being screwed into the flange 55, whereby to maintain the tool in proper position, and engaged in the gear hub for driving action by the latter. Screwed into the flange on the other side of the gear housing is a handle member 58. This may be screwed into either of the flanges 55 in accordance with whether the operator is right or left handed. The hub 52 is provided with a plurality of openings 59, for the reception of fastening means carried by a die holder, whereby such die may be properly held for driving by the motor.

Screwed into the outer end of the shaft 40 is the shaft of a wheel 60, which wheel serves as a rest for one end of the device, to relieve the workman of the entire weight, while in operation. This is especially useful when the device is used for cutting threads, or for other work requiring movement of the device, during the cutting operations.

What is claimed is:

1. A gear set including a hollow shiftable gear, a disk clutch within the gear and having certain of the disks thereof operatively engaged with the gear for rotation therewith, and means operatively connected with the other disks of the clutch and adapted for simultaneously shifting the gear from one speed position to another and for setting the clutch at either position of the gear.

2. A gear set including a hollow shiftable gear having grooves therein, a disk clutch within the gear and having certain of its disks provided with means engaged in said grooves whereby the disks and gear rotate together, and an operating rod operatively connected with the other disks and adapted for shifting the gear from one speed position to another and for setting the clutch at either position of the gear.

3. A device of the character named including a casing having a tubular support, a gear set within the casing including a shiftable gear having a clutch therein, means operatively connected with the clutch comprising a rod for shifting the gear and operating the clutch, means connected with the rod slidably arranged in said support for moving the rod, and rotatable means for holding the slidable means in either position upon rotation of the rotatable means in either direction at either limit of its movement.

In testimony whereof, I affix my signature.

CLARENCE B. STRAND.